Aug. 13, 1968 ZIN IGUCHI 3,396,977

GREASE SEALED BEARINGS

Filed July 19, 1966

INVENTOR.
ZIN IGUCHI
BY
Mason, Fenwick & Lawrence
ATTORNEYS

United States Patent Office 3,396,977
Patented Aug. 13, 1968

3,396,977
GREASE SEALED BEARINGS
Zin Iguchi, Misasagicho, Japan, assignor to Koyo Seiko Company, Ltd., a corporation of Japan
Filed July 19, 1966, Ser. No. 566,419
Claims priority, application Japan, July 20, 1965, 40/59,920
2 Claims. (Cl. 277—94)

ABSTRACT OF THE DISCLOSURE

An antifriction bearing assembly including spaced relatively rotatable inner and outer race ring members disposed in concentric relation and held against relative axial movement, said outer ring member having a radially inwardly opening stop groove adjacent one end thereof which is of a substantially square groove providing an annular planiform stop shoulder lying perpendicular to the axis of the ring members spaced from said one end forming a side wall of the groove, said inner ring including a cylindrical outer surface having an annular outwardly concave sealing portion therein, a unitary seal carried by said outer ring member cooperating with said ring members to define one end of a sealed grease chamber between said ring members, said seal comprising an annular outer rubber-like elastic body having an annular rigid ring core forming a relatively rigid reinforcing core embedded therein, said elastic body including a block-like formation along the outer edge thereof tightly seated in said stop groove having an annular planar surface portion abutting said stop shoulder, said elastic body further including a forked inner edge formation including a radially inwardly projecting lip and a radially inwardly divaricating lip with an inner surface of said seal body, said first lip providing an inwardly straight section pliably in contact with a concave portion of said inner ring member, said second lip extending along an inclined inner flange of said rigid ring forming a crotch with said first lip having a radially inner cylindrical surface disposed in spaced concentric overlying relation to an annular portion of said cylindrical outer surface of said inner ring member and said second lip in slightly spaced relation to said annular surface portion of said inner ring member over the range of fluid pressures encountered in said bearing during use.

---

The present invention relates generally to bearings and more specifically to grease sealed bearings in which the resilient projection of the seal body fitted to the outer bearing race is in contact with the inner bearing race.

Various suggestions have been heretofore proposed for sealed structure in which to seal the ends of antifriction bearings, having rolling members between the inner and outer races but the suggestions are not always satisfactory, especially when the bearings made according to the suggestions are used under dusty or humid conditions or subjected to severe frictional wear.

When a bearing seal is made of an elastic substance and is provided with a tongue-shaped or straight edge that is subjected to friction due to contact with the cylindrical race surfaces or ends, there takes place strong frictional resistance which not only hampers high speed rotation but causes heat and wear of seal edges.

If that edge of the seal which lies against the bearing race is formed into divergently extending ribs and has uniform elasticity, the seal edge moves along the race surface by axial displacement of the outer race with respect to the inner race which sometimes occurs during rotation. This increases the wear of the seal edge and forces out grease from the bearing. In the worst case, the grease that was forced out comes back into the bearing after it got contact with dirt and dust.

Accordingly, it is an object of the invention to provide a grease sealed bearing that hermetically seals the lubricant chamber of the bearing without causing damage to the seal edge.

It is a further object of the invention to provide a grease sealed bearing that will perform the dual function of retaining a lubricant within the bearing and at the same time diverting the direction of flow of grease inwardly toward the zone occupied by a rotary member between the annular races.

It is a still further object of the invention to provide an improved demountable seal of reinforced device which may be easily and properly placed in sealing relation across the annular lubricant chamber between a pair of relatively rotatable members without extending the axial length of bearing race members and reducing the area occupied by lubricant.

These and other objects and advantages of the invention will become apparent from the following detailed description taken in conjunction with the drawings in which.

This invention consists in a bearing having coaxial inner and outer races rotatable relative to each other and a seal member for confining grease to the region between the surfaces of the races, said seal member being secured to one race, preferably the outer race, and extending across the end of the annular space between the races, and having a first annular lip portion of rubber or plastic which bends resiliently on contact with an annular recess provided in the shoulder portion of the other race, preferably the inner race, and a second annular lip portion of rubber or plastic which slightly contacts the cylindrical surface of the inner race, adjacent to the recess thereof, to shield the end of the cylindrical surface, said seal member also having a rigid core supporting the rubber or plastic seal body with a block-shaped projection to be properly inserted into the groove of the outer race.

Figure 1:
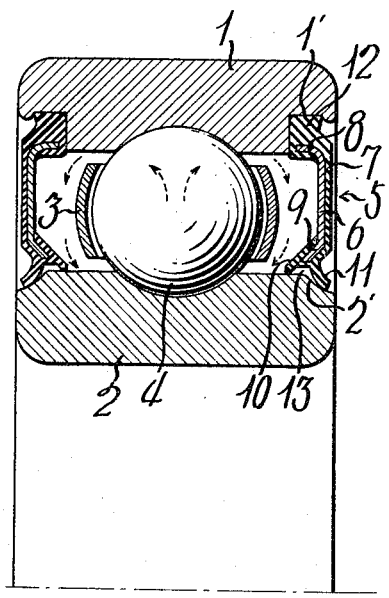
FIG. 1 is a view of a sealed ball bearing shown in central radial section.

Referring now to the drawings, and in particular to FIG. 1, there is shown a ball bearing assembly which includes an annular outer race 1, an annular race 2 concentrically aligned with the outer race 1, and a series of rolling elements such as ball 4 disposed in an annular race defined by the adjacent surfaces of the inner and outer races 1 and 2, and located in circumferentially spaced relation by a suitable cage or retainer 3. The seal for the bearing comprises a seal body 5 having a relatively rigid center core formed by a metal ring having a core 6 having an axially inwardly projecting flange 8 at its radially outwardly disposed end extending toward the annular race and a slightly inclined frustoconical flange 9 inclined slightly at its inwardly disposed edge. The core 6 is covered by a rubber or similar plastic body 7 except for one surface facing rolling members. The body 7 is formed into an elastic block-like projection 12 extending into a suitable retaining groove 1' in the outer race 1, and has a forked seal formation along its inner edge having a radially inwardly extending elastic first lip portion 11 adapted to resiliently contact a generally inclined recess 2' in the radially outer or shoulder surface of the inner race 2, that is, in the cylindrical surface of the end thereof and a second lip portion 10 extending along the inclined flange 9 of the rigid core 6 in proximity to the cylindrical surface between the raceway and recess.

Figure 2:
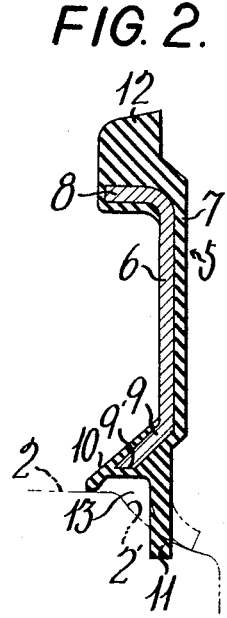
FIG. 2 is a cross sectional view showing in detail a seal body.

FIG. 2 is an enlarged view of the seal member 5 alone. The rigid core 6 is molded in the seal body 7 made of rubber or plastic. In normal condition, that is, before the seal member 5 is fitted to the outer race 1, the first lip portion 11 extends perpendicularly. When the seal member 5 is fitted to the outer race 1, because of its elasticity the first lip portion 11 contacts the surface of the recess 2' of the inner race 2 and bends along the concave of the recess. The projection 12 of block shape (sectionally) formed on the peripheral portion of the rigid core 6, when inserted to the groove 1' of the outer race 1 properly, supports the seal body 7 vertically and disposes the first and second lip portions 11 and 10 correctly in the recess 2' and the adjacent cylindrical surface of the inner race 2, respectively. The seal member 5 has such dimensions that the projection 12 is fitted properly to the groove 1' to fix the position of the seal member relative to the races, while the first lip portion 11 is in resilient contact with the recess 2' so that the shoulder portion of the inner race 2 is sealed by the first lip portion. The second lip portion 10 extends close to the cylindrical surface of the inner race across the recess so that the edge of the second lip portion slightly contacts the cylindrical surface.

The first lip portion 11 in resilient contact with the recess 2' of the inner race 2 closes an annular channel or opening between the outer race 1 and the inner race 2, while the second lip 10 forms inside the first lip a substantial roof for the recess and the adjacent cylindrical surface of the inner race and diverts the direction of flow of grease from the inner peripheral zone of the outer race 1 to the raceway of the inner race 2 and introduces grease inwardly toward the zone occupied by the balls, as indicated by broken line arrows, to prevent grease from flowing directly towards the first lip 11 disposed in the concave shoulder or recess. Thus the second lip 10 shields the elastic first lip portion 11 from direct flow of grease.

Due to the relatively rigid core 6 which forms the center core of the seal body 5, the inclined flange 9 of the core 6 forms a base for the second lip 10 and prevents undue deformation of the formation if the fluid pressure increases during rotation of the bearing. The projection 12 covering the flange 8 of the rigid core 6 is block-shaped in section towards the inside of the bearing. The seal member 5 may be easily and properly fitted into the groove 1' of the outer race 1 by resilience of the projection 12.

The shape of the radially outer portion of the seal body 5 permits the central portion of the sealing body 7 to be disposed substantially flush with the end portion of the inner and outer races, thus increasing the grease accommodating capacity of the bearing without hampering the circulation of the grease.

It will be appreciated that the resilient seal member is provided by the first lip portion 11 in contact with the recess 2' of the inner race 2 and a shield is provided by the second lip portion 10 in slight contact with the cylindrical surface of the inner race. Thus, the bearing according to this invention is perfectly protected from the leakage of grease and infiltration of water or dirt even under humid or dusty conditions, and the second lip portion prevents the leakage of grease caused by increasing fluid pressure of grease during rotation.

It will be apparent that if the inner race 2 is moved by the axial motion of the bearing, the second lip portion 10 without coming into resilient contact with the cylindrical surface of the inner race prevents grease from being forced out by the roof formation inside the first lip portion 11. On the other hand, the first lip portion 11 is in contact with the recess 2' of the inner race 2 by its resilient bending action even when the axial movement of the inner race occurs. The lip porions 10 and 11 form a crotch 13 in between which bestrides the boundary between the recess 2' and the adjacent cylindrical surface of the inner race 2. Thus, the grease in the crotch 13 introduced from the slight gap between the inner peripheral edge of the second lip portion 10 and the cylindrical surface of the inner race 2 lubricates and prevents friction between the first lip poriton 11 and the recess 2'.

Figure 3:
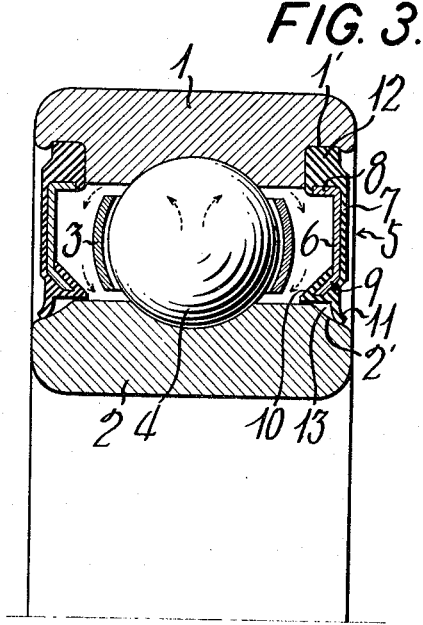
FIG. 3 is a view similar to FIG. 1 but showing a modification thereof.

A modification of the bearing of FIG. 1 is shown in FIG. 3. In the modifications illustrated, the seal body 5 has a lip portion 10, which is substantially triangular in profile and which has an axially inwardly directed apex, so that diversion of the direction of flow of grease will be ensured. There is a slight gap between the inner peripheral surface of the lip portion 10 and the cylindrical surface of an inner race 2 so as to effectively prevent grease from being forced out towards a recess 2' of the inner race.

It will be appreciated that the invention is applicable for example to roller bearings of various different types and that the application of the invention is not limited to ball bearings alone.

What I claim is:

1. An antifriction bearing assembly including spaced relatively rotatable inner and outer race ring members disposed in concentric relation and held against relative axial movement, said outer ring member having a radially inwardly opening stop groove adjacent one end thereof which is of a substantially square groove providing an annular planiform stop shoulder lying perpendicular to the axis of the ring members spaced from said one end forming a side wall of the groove, said inner ring including a cylindrical outer surface having an annular outwardly concave sealing portion therein, a unitary seal carried by said outer ring member cooperating with said ring members to define one end of a sealed grease chamber between said ring members, said seal comprising an annular outer rubber-like elastic body having an annular rigid ring core forming a relatively rigid reinforcing core embedded therein, said elastic body including a block-like formation along the outer edge thereof tightly seated in said stop groove having an annular planar surface portion abutting said stop shoulder, said elastic body further including a forked inner edge formation including a radially inwardly projecting lip and a radially inwardly divaricating lip with an inner surface of said seal body, said first lip providing an inwardly straight section pliably in contact with a concave portion of said inner ring member, said second lip extending along an inclined inner flange of said rigid ring forming a crotch with said first lip having a radially inner cylindrical surface disposed in spaced concentric overlying relation to an annular portion of said cylindrical outer surface of said inner ring member and said second lip in slightly spaced relation to said annular surface portion of said inner ring member over the range of fluid pressures encountered in said bearing during use.

2. A device according to claim 1, wherein said second lip portion is of triangular cross-section having a radially inner cylindrical surface disposed in spaced concentric overlying relation to an annular portion of said cylindrical outer surface of said inner ring.

References Cited

UNITED STATES PATENTS

| | | | |
|---|---|---|---|
| 2,755,113 | 7/1956 | Baumheckel | 308—187.2 |
| 3,113,814 | 12/1963 | Ogura | 308—187.2 |
| 3,203,740 | 8/1965 | Peickii et al. | 277—94 X |

FOREIGN PATENTS 546,260    7/1942    Great Britain.

MARTIN P. SCHWADRON, *Primary Examiner.*

CARROLL B. DORITY, *Assistant Examiner.*